(12) United States Patent
Miao et al.

(10) Patent No.: US 10,159,040 B2
(45) Date of Patent: Dec. 18, 2018

(54) ACCESS NODE DORMANCY

(71) Applicant: Nokia Solutions and Networks Oy, Espoo (FI)

(72) Inventors: De Shan Miao, Beijing (CN); Naizheng Zheng, Beijing (CN); Jianhong Mou, Beijing (CN); Xiaoyi Wang, Hoffman Estates, IL (US); Lei Du, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 66 days.

(21) Appl. No.: 14/781,933

(22) PCT Filed: Apr. 3, 2013

(86) PCT No.: PCT/CN2013/073747
§ 371 (c)(1),
(2) Date: Oct. 2, 2015

(87) PCT Pub. No.: WO2014/161193
PCT Pub. Date: Oct. 9, 2014

(65) Prior Publication Data
US 2016/0066264 A1 Mar. 3, 2016

(51) Int. Cl.
*H04W 52/02* (2009.01)
*H04W 74/00* (2009.01)
*H04W 76/27* (2018.01)

(52) U.S. Cl.
CPC ..... *H04W 52/0206* (2013.01); *H04W 74/002* (2013.01); *H04W 76/27* (2018.02); *Y02D 70/00* (2018.01); *Y02D 70/1242* (2018.01)

(58) Field of Classification Search
CPC .......... H04W 52/0206; H04W 76/048; H04W 74/002; H04W 76/046
See application file for complete search history.

(56) References Cited

U.S. PATENT DOCUMENTS

2008/0168160 A1 7/2008 Tan et al.
2011/0092234 A1* 4/2011 Kim ...................... H04W 48/14
455/507

(Continued)

FOREIGN PATENT DOCUMENTS

CN 101145829 A 3/2008
CN 101541068 A 9/2009

(Continued)

OTHER PUBLICATIONS

Shenzhen C: *Dynamic Setup of HNBs for Energy Savings and Interference Reduction* 3rd Generation Partnership Project (3GPP); TechnicalSpecification Group (TSG) Radio Access Network (RAN); Workinggroup 3 (WG3), vol. R3-080658, Mar. 31, 2008, pp. 1-6, XP003023429.

(Continued)

*Primary Examiner* — Jackie Zuniga Abad
(74) *Attorney, Agent, or Firm* — Harrington & Smith

(57) ABSTRACT

A technique including determining that a first access node serving a communication device is currently in a dormant, first state in which said first access node is not receiving radio transmissions; and controlling a radio transmitter or radio transceiver at said communication device to transmit a radio signal that triggers at least one second access node to alert said first access node of a request for said first access node to switch from said first state to a second state in which said first access node receives radio transmissions.

20 Claims, 6 Drawing Sheets

(56) References Cited

U.S. PATENT DOCUMENTS

2012/0106423 A1    5/2012  Nylander et al.
2012/0300686 A1*  11/2012  Maeda .............. H04W 52/0206
                                                                    370/311

FOREIGN PATENT DOCUMENTS

| CN | 102045807 A | 5/2011 |
| CN | 102638874 A | 8/2012 |
| EP | 2312889 A1 | 4/2011 |
| EP | 2446673 A1 | 5/2012 |
| WO | WO-2010/151186 A1 | 12/2010 |

OTHER PUBLICATIONS

Qualcomm Incorporated "Mechanisms for efficient small cell operation"; R1-130595; 3GPP TSG-RAN WG1 #72; Jan. 28-Feb. 1, 2013; St. Julian, Malta; 3 pages; 3rd Generation Partnership Project (3GPP); Mobile Competence Centre; 650, Route des Lucioles; F-06921 Sophia-Antipolis Cedex; France.

Imran Ashraf et al: "Power Savings in Small Cell Deployments via Sleep Mode Techniques"; 2010 IEEE, 21st International Symposium on Personal, Indoor and Mobile Radio Communications Workshops; ISBN: 978-1-4244-9116-2; pp. 307-311; IEEE; 3 Park Avenue; New York; NY 10016-5997; USA.

Claudio Rosa et al: "eNB dormancy for NCT (in the context of small cell enhancements)"; NCT Meeting #10, Nov. 26, 2012; 9 pages.

3GPP TS 36.304 V11.3.0 (Mar. 2013) "3rd Generation Partnership Project; Technical Specification Group Radio Access Network; Evolved Universal Terrestrial Radio Access (E-UTRA); User Equipment (UE) procedures in idle mode (Release 11)"; 34 pages; 3rd Generation Partnership Project (3GPP); Mobile Competence Centre; 650, Route des Lucioles; F-06921 Sophia-Antipolis Cedex; France.

* cited by examiner

ACCESS NODE DORMANCY

Saving energy at access nodes of a radio access network is one focus of the current development of radio access networks.

There has been identified the challenge of operating one or more access nodes of a radio access network in a way that better reduces power consumption whilst maintaining a high level of service to communication devices served by those access nodes.

There is hereby provided a method, comprising: determining that a first access node serving a communication device is currently in a dormant, first state in which said first access node is not receiving radio transmissions; and controlling a radio transmitter or radio transceiver at said communication device to transmit a radio signal that triggers at least one second access node to alert said first access node of a request for said first access node to switch from said first state to a second state in which said first access node receives radio transmissions.

According to one embodiment, said radio signal is transmitted via a random access channel, and said radio signal indicates a selected one of a subset of predefined preamble sequences.

According to one embodiment, said radio signal indicates one of a plurality of predefined priority levels.

According to one embodiment, (i) a time slot used for transmission of said radio signal, or (ii) a preamble sequence indicated by said radio signal, indicates said one of a plurality of predefined priority levels.

There is also hereby provided a method comprising: controlling a radio receiver or radio transceiver at a second access node to monitor radio resources via which one or more communication devices served by a first access node currently in a dormant, first state are configured to transmit one or more radio signals indicating a request for said first access node to switch from said dormant state to a second state in which said first access node receives radio transmissions; and in response to detecting one or more radio signals indicating said request, alerting said first access node of a request for said first access node to switch from said first state to said second state.

According to one embodiment, said radio resources are radio resources allocated to a random access channel for the first access node.

According to one embodiment, the method comprises monitoring the signals received from said radio receiver or radio transceiver for any signal indicating one of a predefined subset of predefined preamble sequences.

According to one embodiment, said controlling is based on information received from said first access node about one or more characterizing features of radio signals used by communication devices served by said first access node to indicate a request for said first access node to exit said dormant state.

According to one embodiment, the method further comprises receiving from said first access node information about when said first access node is in said dormant, first state.

There is also hereby provided a method comprising: controlling a first access node to enter a dormant, first state in which said first access node does not receive radio transmissions; and in advance of said first access node entering said first state, controlling a radio transmitter or radio transceiver to transmit to one or more communication devices served by said first access node information about one or more features of radio signals to be used by said one or more communication devices to alert at least one second access node of a request for said first access node to switch to a second state in which said first access node receives radio transmissions.

According to one embodiment, said information transmitted to said one or more communication devices identifies a predefined subset of predefined preamble sequences from a larger set of said predefined preamble sequences.

According to one embodiment, the method further comprises: providing information to said at least one second access node about one or more characterizing features of radio signals to be used by said one or more communication devices to alert said at least one second access node of a request for said first access node to switch to said second state.

According to one embodiment, said information provided to said at least one second access node identifies a predefined subset of predefined preamble sequences from a larger set of said predefined preamble sequences.

According to one embodiment, said controlling a first access node to enter a dormant, first state is at least partly based on information about the state of one or more other access nodes capable of detecting signals transmitted by one or more communication devices within the coverage area of said first access node.

According to one embodiment, the method further comprises providing to said at least one second access node information about when said first access node is in said dormant, first state.

There is also hereby provided a method comprising: controlling a first access node to enter a dormant, first state in which said first access node does not receive radio transmissions other than at predefined time slots reserved for receiving alert signals from one or more communication devices served by said first access node; and in advance of said first access node entering said first state, controlling a radio transmitter or radio transceiver to transmit to one or more communication devices served by said first access node information about said one or more time slots; wherein said one or more alert signals are recognizable by said first access node as one or more requests for said first access node to switch from said first state to a second state in which said first access node is more open to receiving radio transmissions.

There is also hereby provided a method, comprising: controlling a radio receiver or radio transceiver at a communication device to receive one or more transmissions by a first access node serving said communication device indicating one or more time slots reserved for receiving one or more alert signals at said first access node when said first access node is in a dormant, first state in which said first access node is not open to receiving radio transmissions other than at predefined time slots reserved for receiving one or more alert signals from one or more communication devices served by said first access node; and controlling a radio transmitter or radio transceiver at said communication device to transmit an alert signal at one or more of said time slots; wherein said alert signal is recognizable by said first access node as a request for said first access node to switch from said first state to a second state in which said first access node is more open to receiving radio transmissions.

There is also hereby provided an apparatus comprising: a processor and memory including computer program code, wherein the memory and computer program code are configured to, with the processor, cause the apparatus to: determine that a first access node serving a communication device is currently in a dormant, first state in which said first access node is not receiving radio transmissions; and control a radio transmitter or radio transceiver at said communication device to transmit a radio signal that triggers at least one second access node to alert said first access node of a request for said first access node to switch from said first state to a second state in which said first access node receives radio transmissions.

According to one embodiment, said radio signal is transmitted via a random access channel, and said radio signal indicates a selected one of a subset of predefined preamble sequences.

According to one embodiment, said radio signal indicates one of a plurality of predefined priority levels.

According to one embodiment, (i) a time slot used for transmission of said radio signal, or (ii) a preamble sequence indicated by said radio signal, indicates said one of a plurality of predefined priority levels.

There is also hereby provided an apparatus comprising: a processor and memory including computer program code, wherein the memory and computer program code are configured to, with the processor, cause the apparatus to: control a radio receiver or radio transceiver at a second access node to monitor radio resources via which one or more communication devices served by a first access node currently in a dormant, first state are configured to transmit one or more radio signals indicating a request for said first access node to switch from said dormant state to a second state in which said first access node receives radio transmissions; and in response to detecting one or more radio signals indicating said request, alert said first access node of a request for said first access node to switch from said first state to said second state.

According to one embodiment, said radio resources are radio resources allocated to a random access channel for the first access node.

According to one embodiment, the memory and computer program code are further configured to, with the processor, cause the apparatus to monitor the signals received from said radio receiver or radio transceiver for any signal indicating one of a predefined subset of predefined preamble sequences.

According to one embodiment, said controlling is based on information received from said first access node about one or more characterizing features of radio signals used by communication devices served by said first access node to indicate a request for said first access node to exit said dormant state.

According to one embodiment, the memory and computer program code are further configured to, with the processor, cause the apparatus to: receiving from said first access node information about when said first access node is in said dormant, first state.

There is also hereby provided an apparatus comprising: a processor and memory including computer program code, wherein the memory and computer program code are configured to, with the processor, cause the apparatus to: control a first access node to enter a dormant, first state in which said first access node does not receive radio transmissions; and in advance of said first access node entering said first state, control a radio transmitter or radio transceiver to transmit to one or more communication devices served by said first access node information about one or more features of radio signals to be used by said one or more communication devices to alert at least one second access node of a request for said first access node to switch to a second state in which said first access node receives radio transmissions.

According to one embodiment, said information transmitted to said one or more communication devices identifies a predefined subset of predefined preamble sequences from a larger set of said predefined preamble sequences.

According to one embodiment, the memory and computer program code are further configured to, with the processor, cause the apparatus to: provide information to said at least one second access node about one or more characterizing features of radio signals to be used by said one or more communication devices to alert said at least one second access node of a request for said first access node to switch to said second state.

According to one embodiment, said information provided to said at least one second access node identifies a predefined subset of predefined preamble sequences from a larger set of said predefined preamble sequences.

According to one embodiment, said controlling a first access node to enter a dormant, first state is at least partly based on information about the state of one or more other access nodes capable of detecting signals transmitted by one or more communication devices within the coverage area of said first access node.

According to one embodiment, the memory and computer program code are further configured to, with the processor, cause the apparatus to provide to said at least one second access node information about when said first access node is in said dormant, first state.

There is also hereby provided an apparatus comprising: a processor and memory including computer program code, wherein the memory and computer program code are configured to, with the processor, cause the apparatus to: control a first access node to enter a dormant, first state in which said first access node does not receive radio transmissions other than at predefined time slots reserved for receiving alert signals from one or more communication devices served by said first access node; and in advance of said first access node entering said first state, control a radio transmitter or radio transceiver to transmit to one or more communication devices served by said first access node information about said one or more time slots; wherein said one or more alert signals are recognizable by said first access node as one or more requests for said first access node to switch from said first state to a second state in which said first access node is more open to receiving radio transmissions.

There is also hereby provided an apparatus comprising: a processor and memory including computer program code, wherein the memory and computer program code are configured to, with the processor, cause the apparatus to: control a radio receiver or radio transceiver at a communication device to receive one or more transmissions by a first access node serving said communication device indicating one or more time slots reserved for receiving one or more alert signals at said first access node when said first access node is in a dormant, first state in which said first access node is not open to receiving radio transmissions other than at predefined time slots reserved for receiving one or more alert signals from one or more communication devices served by said first access node; and control a radio transmitter or radio transceiver at said communication device to transmit an alert signal at one or more of said time slots; wherein said alert signal is recognizable by said first access node as a request for said first access node to switch from said first state to a second state in which said first access node is more open to receiving radio transmissions.

There is also hereby provided an apparatus comprising: means for determining that a first access node serving a communication device is currently in a dormant, first state in which said first access node is not receiving radio transmissions; and means for controlling a radio transmitter or radio transceiver at said communication device to transmit a radio signal that triggers at least one second access node to alert said first access node of a request for said first access node to switch from said first state to a second state in which said first access node receives radio transmissions.

There is also hereby provided an apparatus comprising: means for controlling a radio receiver or radio transceiver at a second access node to monitor radio resources via which one or more communication devices served by a first access node currently in a dormant, first state are configured to transmit one or more radio signals indicating a request for said first access node to switch from said dormant state to a second state in which said first access node receives radio transmissions; and means for, in response to detecting one or more radio signals indicating said request, alerting said first access node of a request for said first access node to switch from said first state to said second state.

There is also hereby provided an apparatus comprising: means for controlling a first access node to enter a dormant, first state in which said first access node does not receive radio transmissions; and means for, in advance of said first access node entering said first state, controlling a radio transmitter or radio transceiver to transmit to one or more communication devices served by said first access node information about one or more features of radio signals to be used by said one or more communication devices to alert at least one second access node of a request for said first access node to switch to a second state in which said first access node receives radio transmissions.

There is also hereby provided an apparatus comprising: means for controlling a first access node to enter a dormant, first state in which said first access node does not receive radio transmissions other than at predefined time slots reserved for receiving alert signals from one or more communication devices served by said first access node; and means for, in advance of said first access node entering said first state, controlling a radio transmitter or radio transceiver to transmit to one or more communication devices served by said first access node information about said one or more time slots; wherein said one or more alert signals are recognizable by said first access node as one or more requests for said first access node to switch from said first state to a second state in which said first access node is more open to receiving radio transmissions.

There is also hereby provided an apparatus comprising: means for controlling a radio receiver or radio transceiver at a communication device to receive one or more transmissions by a first access node serving said communication device indicating one or more time slots reserved for receiving one or more alert signals at said first access node when said first access node is in a dormant, first state in which said first access node is not open to receiving radio transmissions other than at predefined time slots reserved for receiving one or more alert signals from one or more communication devices served by said first access node; and means for controlling a radio transmitter or radio transceiver at said communication device to transmit an alert signal at one or more of said time slots; wherein said alert signal is recognizable by said first access node as a request for said first access node to switch from said first state to a second state in which said first access node is more open to receiving radio transmissions.

There is also hereby provided a computer program product comprising program code means which when loaded into a computer controls the computer to: determine that a first access node serving a communication device is currently in a dormant, first state in which said first access node is not receiving radio transmissions; and control a radio transmitter or radio transceiver at said communication device to transmit a radio signal that triggers at least one second access node to alert said first access node of a request for said first access node to switch from said first state to a second state in which said first access node receives radio transmissions.

There is also hereby provided a computer program product comprising program code means which when loaded into a computer controls the computer to: control a radio receiver or radio transceiver at a second access node to monitor radio resources via which one or more communication devices served by a first access node currently in a dormant, first state are configured to transmit one or more radio signals indicating a request for said first access node to switch from said dormant state to a second state in which said first access node receives radio transmissions; and in response to detecting one or more radio signals indicating said request, alert said first access node of a request for said first access node to switch from said first state to said second state.

There is also hereby provided a computer program product comprising program code means which when loaded into a computer controls the computer to: control a first access node to enter a dormant, first state in which said first access node does not receive radio transmissions; and in advance of said first access node entering said first state, control a radio transmitter or radio transceiver to transmit to one or more communication devices served by said first access node information about one or more features of radio signals to be used by said one or more communication devices to alert at least one second access node of a request for said first access node to switch to a second state in which said first access node receives radio transmissions.

There is also hereby provided a computer program product comprising program code means which when loaded into a computer controls the computer to: control a first access node to enter a dormant, first state in which said first access node does not receive radio transmissions other than at predefined time slots reserved for receiving alert signals from one or more communication devices served by said first access node; and in advance of said first access node entering said first state, control a radio transmitter or radio transceiver to transmit to one or more communication devices served by said first access node information about said one or more time slots; wherein said one or more alert signals are recognizable by said first access node as one or more requests for said first access node to switch from said first state to a second state in which said first access node is more open to receiving radio transmissions.

There is also hereby provided a computer program product comprising program code means which when loaded into a computer controls the computer to: control a radio receiver or radio transceiver at a communication device to receive one or more transmissions by a first access node serving said communication device indicating one or more time slots reserved for receiving one or more alert signals at said first access node when said first access node is in a dormant, first state in which said first access node is not open to receiving radio transmissions other than at predefined time slots reserved for receiving one or more alert signals from one or more communication devices served by said first access node; and control a radio transmitter or radio transceiver at said communication device to transmit an alert signal at one or more of said time slots; wherein said alert signal is recognizable by said first access node as a request for said first access node to switch from said first state to a second state in which said first access node is more open to receiving radio transmissions.

Some embodiments of the present invention are described in detail hereunder, by way of example only, with reference to the accompanying drawings, in which.

Figure 1:
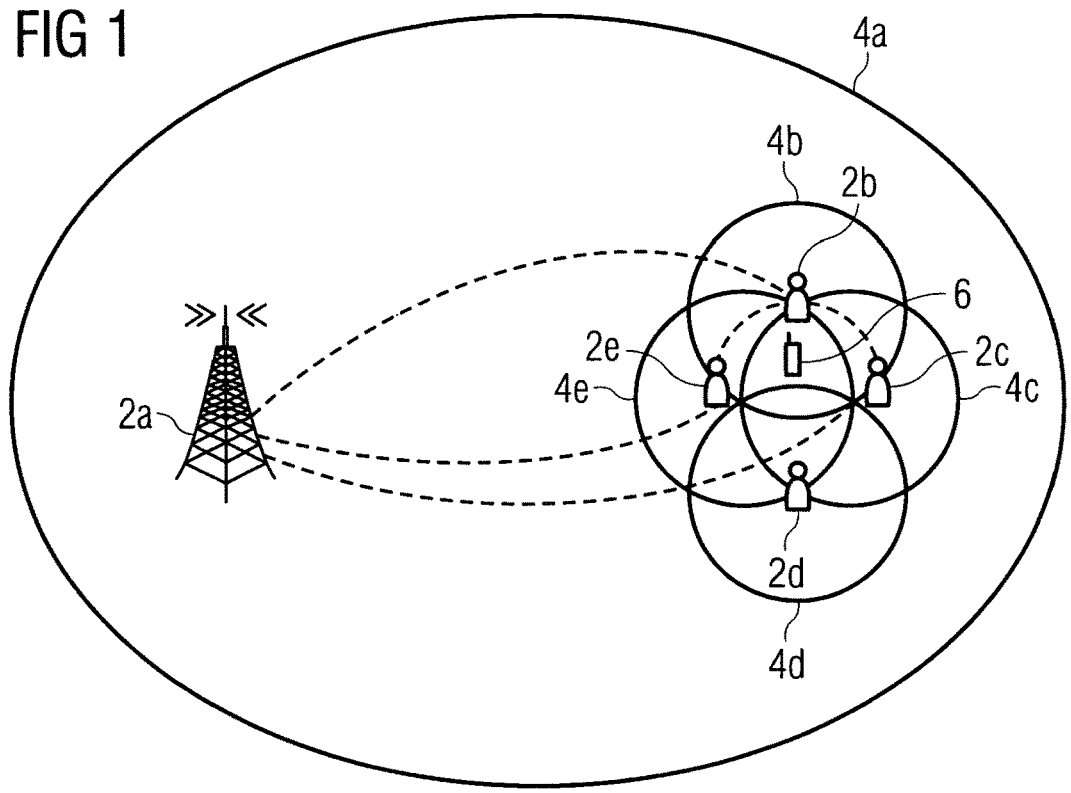
FIG. 1 illustrates an example of a collection of access nodes for which embodiments of the present invention can be implemented.

FIG. 1 illustrates an example of a collection of access nodes in which embodiments of the present invention can be implemented. The collection of nodes includes a macro access node 2a operating at least one cell having a relatively wide coverage area 4a, and a plurality of access nodes 2b, 2c, 2d, 2e operating respective cells having a relatively small coverage area 4b, 4c, 4d, 4e within the wide coverage area 4a of the macro access node 2a. For simplicity, only a single UE 6 is shown in FIG. 1, but a large number of UEs would typically be within the coverage area of a macro access node at any one time.

In this example, the access nodes are base stations (eNodeBs) of an Evolved UTRAN (UMTS Terrestrial Radio Access Network), typically comprising thousands of such base stations each operating one or more cells. The coverage area of each cell depends on the transmission power and the directionality of the antenna by which the cell is operated. Alternatively, the access nodes may be a combination of network entities such as a remote radio head and server or host.

Neighboring eNBs 2 can communicate with each other without relying on a wireless interface. For example, X2 interfaces between neighboring eNodeBs are implemented by wired connections. For simplicity, FIG. 1 only shows (by dashed lines) those X2 interfaces necessary to explain operations according to embodiments of the present invention.

Figure 2A:
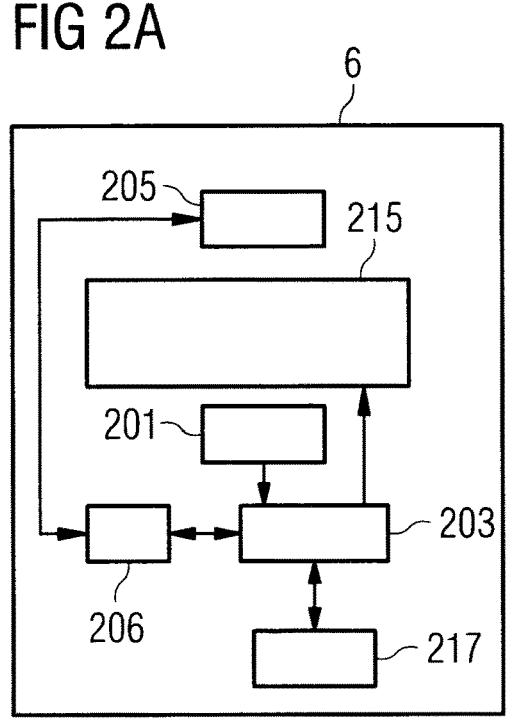
FIG. 2 illustrates an example of apparatus for use at a user equipment (UE) in FIG. 1.

FIG. 2a shows a schematic view of an example of user equipment or user device (UE) 6 that may be used for communicating with the eNBs of FIG. 1 via a wireless interface. The UE 6 may be any device capable of at least sending or receiving radio signals to or from the eNBs 2 of FIG. 1.

UE 6 may, for example, be a device designed for tasks involving human interaction such as making and receiving phone calls between users, and streaming multimedia or providing other digital content to a user. Non-limiting examples include a smart phone, and a laptop computer/notebook computer/tablet computer/e-reader device provided with a wireless interface facility.

The UE 6 may communicate via radio transceiver circuitry, unit or module 206 and associated antenna arrangement 205 comprising at least one antenna or antenna unit. The antenna arrangement 205 may be arranged internally or externally to the UE 2.

The UE 6 may be provided with: a baseband unit comprising one or more baseband processors 203; and at least one memory or data storage entity 217. The baseband processor 203 and one or more memory entities 217 may be provided on an appropriate circuit board and/or in chipsets. The memory or data storage entity 217 is typically internal but may also be external or a combination thereof, such as in the case when additional memory capacity is obtained from a service provider.

In the cases of devices designed for human interaction, the user may control the operation of the UE 6 by means of a suitable user interface such as key pad 201, voice commands, touch sensitive screen or pad, combinations thereof or the like. A display 215, a speaker and a microphone may also be provided. Furthermore, the UE 6 may comprise appropriate connectors (either wired or wireless) to other devices and/or for connecting external accessories, for example hands-free equipment, thereto.

Figure 3A:
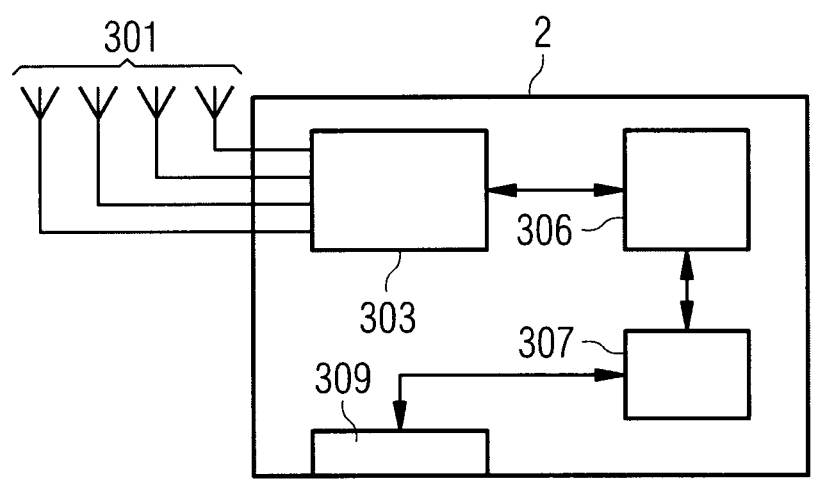
FIGS. 3a and 3b illustrate an example of apparatus for use at an access node in FIG. 1.

FIG. 3a shows one example of apparatus for use at the eNBs 2 of FIG. 1. The apparatus comprises or is coupled to a radio frequency antenna array 301 (comprising at least one antenna or antenna unit) configured to receive and transmit radio frequency signals; radio transceiver circuitry, module or unit 303 configured to interface the radio frequency signals received and transmitted by the antenna array 301; and a baseband unit comprising one or more baseband processors 306. The apparatus usually comprises an interface 309 via which, for example, the baseband processor 306 can communicate with other network elements such as the core network (not shown). The baseband processor 306 is configured to process signals from the radio transceiver 303. It may also control the radio transceiver 303 to generate suitable RF signals to communicate information to UEs or other eNBs via a wireless communications link, and also to exchange information with other network nodes across a wired link (e.g. X2 interface) via the interface 309. The one or more memory or data storage units 307 are used for storing data, parameters and/or instructions for use by the baseband processor 306. The memory or data storage entity may be internal or external (locating in another network entity) or a combination thereof.

Figure 3B:
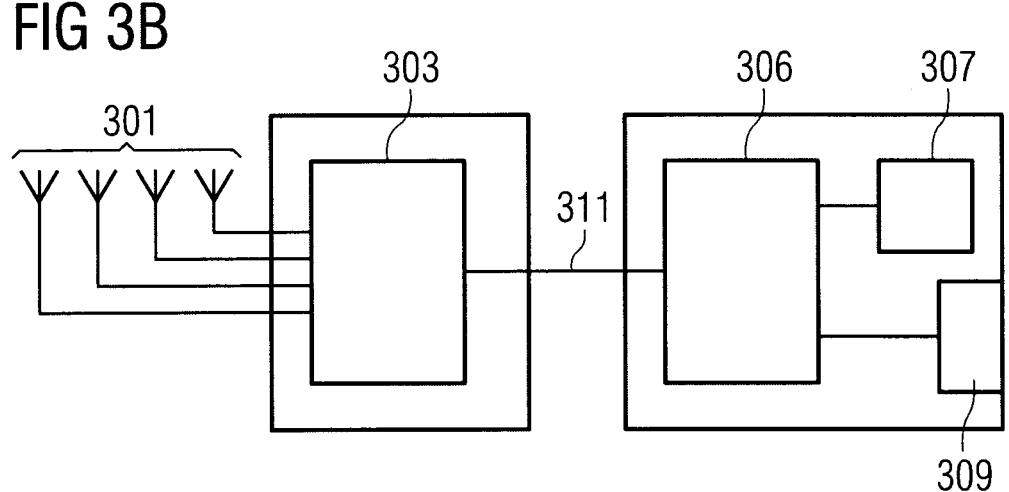

FIG. 3b illustrates another example of apparatus for use at the eNBs of FIG. 1. The apparatus is the same as that of FIG. 3a except that the baseband unit comprising the baseband processor 306 is located remotely from the radio transceiver 303 and the antenna array 301, and is connected to the radio transceiver 303 by e.g. a fibre optic link 311.

The memories 217, 307 may be implemented using an suitable data storage technology, such as, for example, semiconductor based memory devices, flash memory, magnetic memory devices and systems, optical memory devices and systems, fixed memory and removable memory. The data processors 203, 306 may, for example, include one or more of microprocessors, digital signal processors (DSPs) and processors based on a multi-core processor architecture.

References below to baseband processors 203, 306 controlling the operation of other elements of UE and eNBs refer to the baseband processors operating in accordance with program code stored at memories 217, 307.

It would be appreciated that the apparatus shown in each of FIGS. 2 and 3 described above may comprise further elements which are not directly involved with the embodiments of the invention described hereafter.

According to one embodiment of the present invention, the baseband processors 306 at small eNBs 2b-2e switch the small eNBs between an active state in which the small eNB makes and receives transmissions, and a dormant state in which the small eNB does not receive transmissions, and in which power to at least some components of the radio transceiver and baseband unit is reduced or switched off to save energy. In this dormant state, the small eNB may also not make any transmissions, or the small eNB may make a limited amount of transmissions, such as transmissions of reference/discovery signals useful for UEs to make radio resource management (RRM) measurements.

Figure 4:
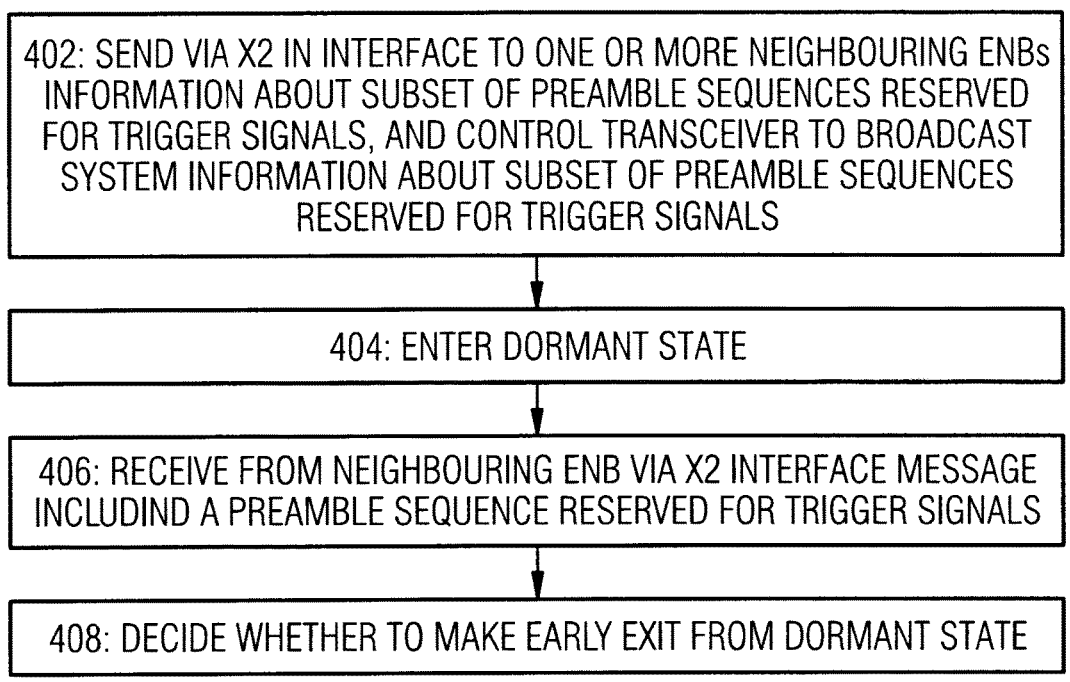
FIGS. 4 and 5 illustrate an example of operations at access nodes in accordance with an embodiment of the present invention.

Examples of operations at the UE 6 and eNBs 2 are described below for the example of UE 6 camped on a cell operated by small eNB 2b of FIG. 1 as the primary cell (PCell) for UE 6. In advance of entering the dormant state, the baseband processor 306 of small eNB 2b controls the transceiver 303 of small eNB to broadcast information about the dormancy pattern for small eNB 2b, i.e. when small eNB 2b plans to be in the dormant state. The baseband processor 306 of small eNB 2b also controls the communication of this dormancy pattern information via respective X2 interfaces to one more neighboring eNBs. If the baseband processor 203 of UE 6 determines from this broadcast information (STEP 604 of FIG. 6) that serving eNB 2b has entered a dormant state (STEP 404 of FIG. 4), and also determines (STEP 606 of FIG. 6) that a communication with small eNB 2b is nevertheless required (because, for example, UE 6 has an urgent data packet to be transmitted), the baseband processor 203 of UE 6 controls (STEP 610 of FIG. 6) the transceiver 206 to transmit a radio signal (i) on radio resources that one or more of the neighboring small eNBs and/or macro eNB are configured to monitor, and (ii) having one or more features that identify the signal to the baseband processor 306 at the monitoring eNB(s) as a request to alert the serving eNB 2b of a request for the serving eNB 2b to switch to a state in which the serving eNB receives radio transmissions. For conciseness, these signals are hereafter referred to as trigger signals. The generation and transmission of the trigger signal is controlled by the baseband processor 203 of UE 6 according to system information previously received (STEP 602 of FIG. 6) from serving eNB when serving eNB was in an active state.

For the purposes of this description of embodiments of the present invention, a neighboring eNB is an eNB that is capable of detecting signals transmitted by one or more UEs from within the coverage area of the serving eNB 2b.

Figure 5:
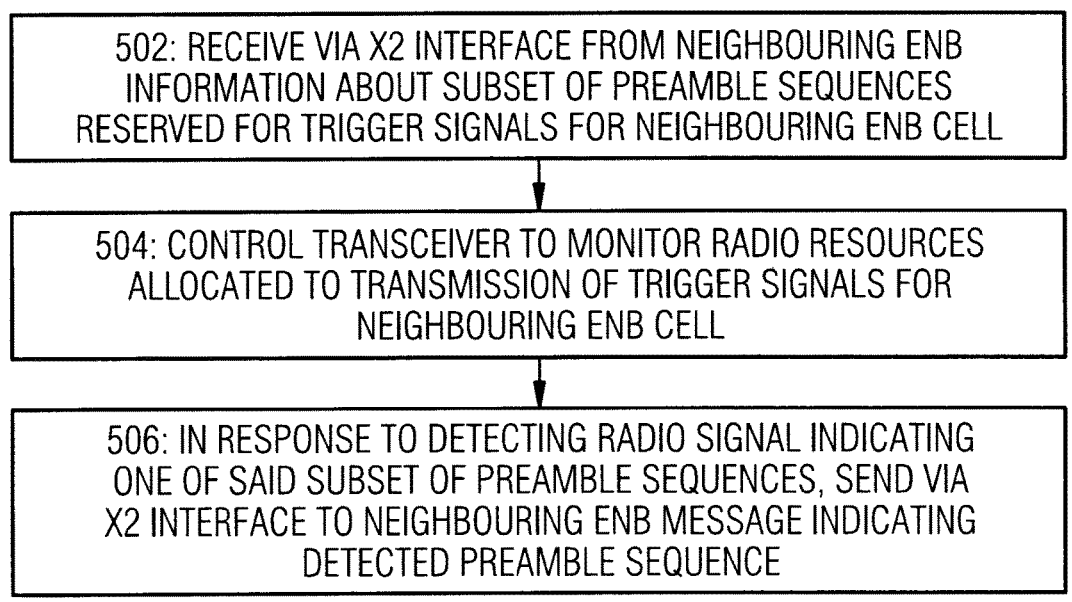

In addition to the dormancy pattern information mentioned above, one or more neighboring eNBs also receive (STEP 502 of FIG. 5) via X2 interface from serving eNB 2b information about one or more characterizing features of signals that UEs served by serving eNB 2b are configured to use for trigger signals; and monitor (STEP 504 of FIG. 5) the radio resources on which UEs served by serving eNB 2b are configured to transmit any trigger signal. In response to detecting a trigger signal at the baseband processor 306 of a neighboring eNB, the baseband processor 306 of the neighboring eNB alerts the serving eNB 2b by means of a message sent via the X2 interface between the two eNBs (STEP 506 of FIG. 5). In response to receiving this message (STEP 406 of FIG. 4), the baseband processor 306 at the serving eNB 2b decides according to rules stored at memory 307 (STEP 408 of FIG. 4) whether to switch serving eNB 2b back to an active state earlier than planned. As discussed in more detail below, this decision may take into a priority level indicated by both the trigger signal transmitted by UE 6 and the message from the monitoring eNB to the serving eNB via the X2 interface.

The trigger signals may be transmitted by UE 6 via a radio channel for the serving eNB cell that shares radio resources with the equivalent radio channel for the one or more eNB cells operated by the one or monitoring eNBs. Alternatively, the trigger signals may be transmitted by UE 6 via radio resources allocated to the one or more monitoring cells and not otherwise used by the serving cell; or the one or more monitoring cells may monitor radio resources associated with the serving cell that the one or more monitoring cells would not otherwise monitor.

Figure 7:
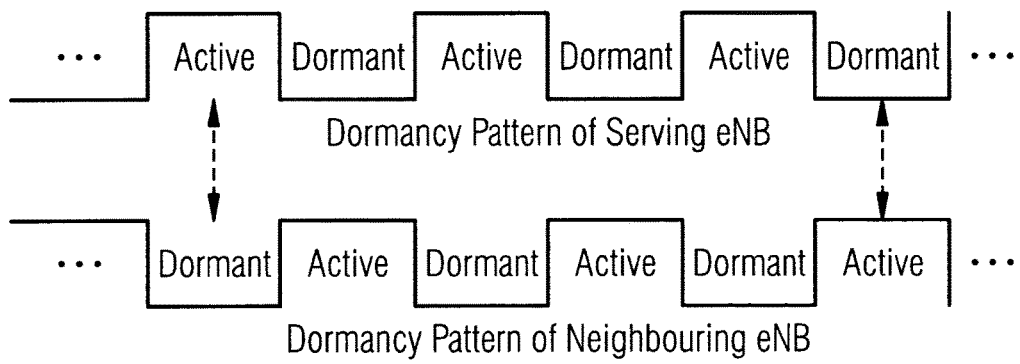
FIG. 7 illustrates one example of a coordinated dormancy pattern configuration according to an embodiment of the present invention.

In the case that the one or more monitoring eNBs are themselves eNBs that are configured to make switches in and out of the same kind of dormant state, the eNBs collectively coordinate their switches into dormant states such that there is always at least one neighboring eNB in an active state (i.e. receiving radio transmissions) capable of monitoring for trigger signals for any other eNB in a dormant state. For the example of two eNBs acting as monitoring nodes for each other, the two eNBs would coordinate their dormancy patterns such that either one of the two eNBs does not enter the dormant state when the other of the two eNBs is in the dormant state. This example is illustrated in FIG. 7.

In order to enable one or more neighboring eNBs (macro eNB and/or other small eNBs) to function as monitoring nodes, the serving eNB 2b provides (STEP 402 of FIG. 4) one or more neighboring eNBs with information by which the one or more neighboring eNBs can detect the transmission of a request by a UE served by the serving eNB for the serving eNB to switch back to an active state. This information can be provided via respective X2 interfaces with the one or more neighboring eNBs. According to one example described below, the trigger signals are sent on a random access channel that is also used by the serving cell for contention based access attempts and non-contention based access attempts when the serving eNB is in an active state. Trigger signals are distinguished from access attempts (both contention based and non-contention based) by using different preamble sequences; and the serving eNB 2b informs (STEP 402 of FIG. 4) the one or more neighboring monitoring eNBs of the subset of preamble sequences reserved for trigger signals, so that the one or more monitoring eNBs can distinguish between a trigger signal (for which the one or more monitoring eNBs are required to take the action described above) and an access attempt made when the serving eNB is in an active state (which access attempts require no action by the one or more monitoring eNBs).

As mentioned above, the trigger signals may be transmitted using the same channel (random access channel) as contention-based access attempts and/or non-contention based access attempts. Access attempts by a UE involve the UE transmitting a PRACH preamble sequence from a set of predefined preamble sequences allocated to the cell via which the access attempt is made. Each preamble sequence may be a respective different combination of a root sequence and the cyclic shift. For example, the total number of PRACH preamble sequences allocated to a cell may be sixty-four. A sub-set of the sixty-four preamble sequences are reserved for non-contention based access attempts; and for non-contention based access attempts, the UE transmits a preamble sequence selected from this subset by the eNB communicated to the UE via Radio Resource Control (RRC)

signaling. Another sub-set of the sixty-four preamble sequences are reserved for contention-based random access attempts; and for contention based access attempts, the UE transmits a preamble sequence randomly selected by the UE from this sub-set of preamble sequences. According to an embodiment of the present invention, yet another sub-set of the sixty-four preamble sequences are reserved for trigger signals of the kind described above.

Figure 8:
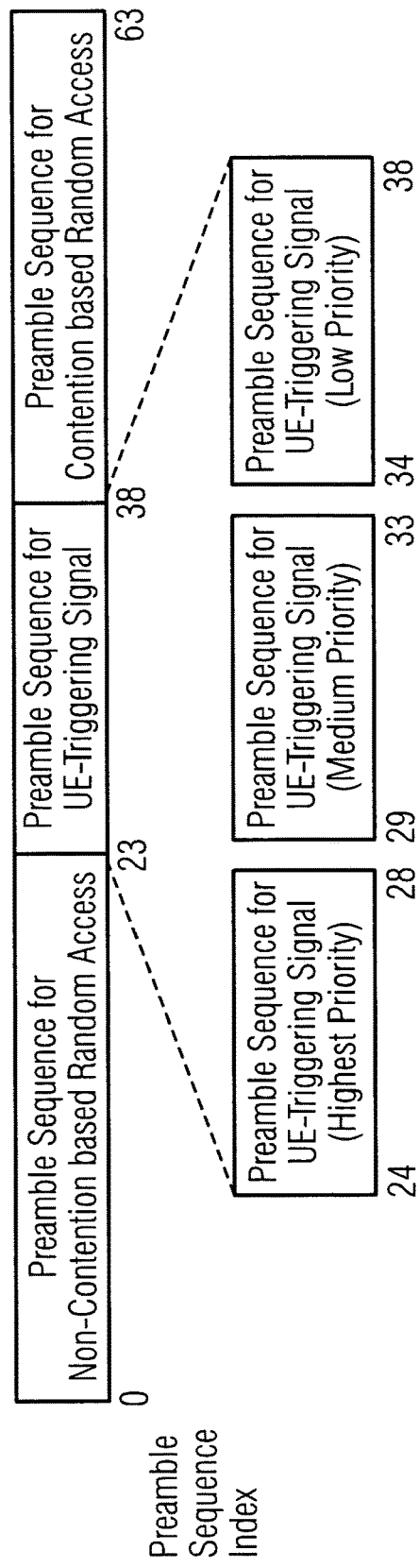
FIG. 8 illustrates one example of the division and classification of preamble sequences according to an embodiment of the present invention.

For example, a sub-set of twenty-four preamble sequences could be reserved for non-contention based access attempts; a different sub-set of fifteen preamble sequences could be reserved for trigger signals; and a different sub-set of twenty-five preamble sequences could be reserved for contention based access attempts. This example is illustrated in FIG. 8. When the serving eNB 2b is in an active state, the baseband processor 306 of the serving eNB 2b controls (STEP 402 of FIG. 4) the transceiver 303 to broadcast system information about which subset of preamble sequences is reserved for trigger signals for serving eNB 2b. The subset of preamble sequences reserved for trigger signals can be communicated to UE 6 by using root sequence indexes, which the baseband processor 203 at UE 6 can map to sequences using a data table stored at memory 207.

The baseband processor 306 at the serving eNB 2b also communicates (STEP 402 of FIG. 4) information about which subset of preamble sequences is reserved for trigger signals to any one or more neighboring eNBs (macro eNB and/or other small eNBs) that are configured to monitor for trigger signals by UEs served by serving eNB 2b. This communication of information to one or more neighboring eNBs can be made via respective X2 interfaces.

The subset of preamble sequences reserved for trigger signals may be further divided into classes, each class of sequences indicating a different priority level. This classification of preamble sequences according to priority level further assists the decision at the baseband processor 306 of the serving eNB 2b about whether to switch serving eNB back to an active state earlier than planned.

For example, a class of five trigger signal preamble sequences may be used to indicate a high priority level; a different class of five trigger signal preamble sequences may be used to indicate a medium priority level; and a yet different class of five trigger signal preamble sequences may be used to indicate a low priority level. This example is also illustrated in FIG. 8. Again, the baseband processor 306 of the serving eNB 2b may control the transceiver 303 of serving eNB 2b to broadcast system information about how the sub-set of trigger signal preamble sequences are further divided according to priority level.

Figure 6:
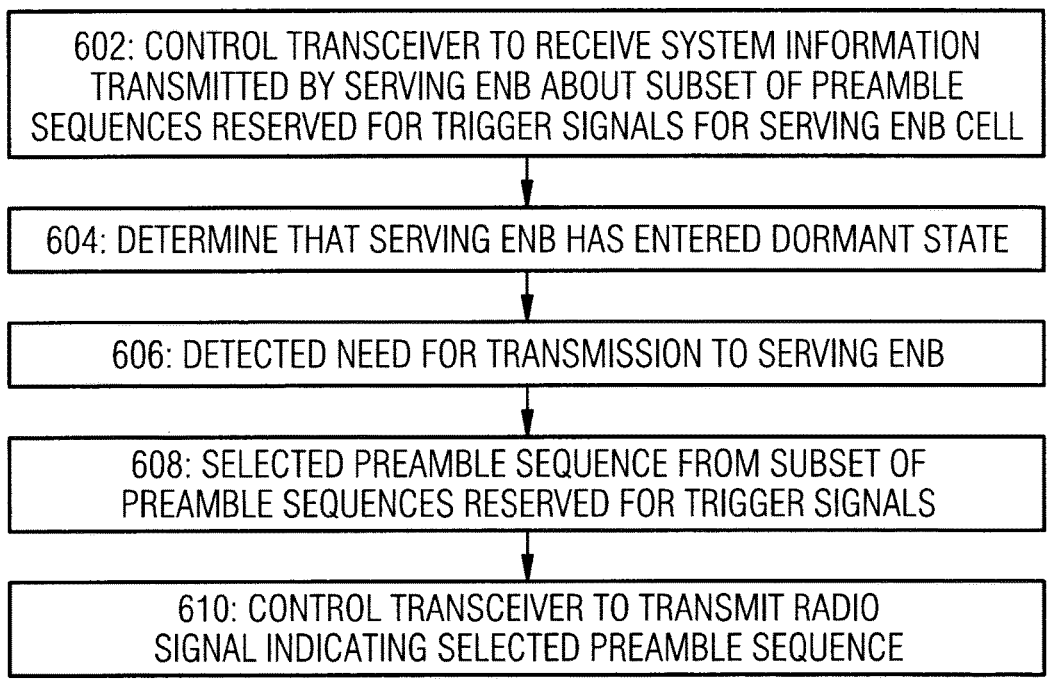
FIG. 6 illustrates an example of operations at a user equipment in accordance with an embodiment of the present invention.

The baseband processor 203 of UE 6 may: select a priority level according to rules stored at the memory 207 of UE; accordingly select a class of preamble sequences from which to select a preamble sequence for a trigger signal; and select a preamble sequence from the selected class (STEP 608 of FIG. 6).

Figure 9:
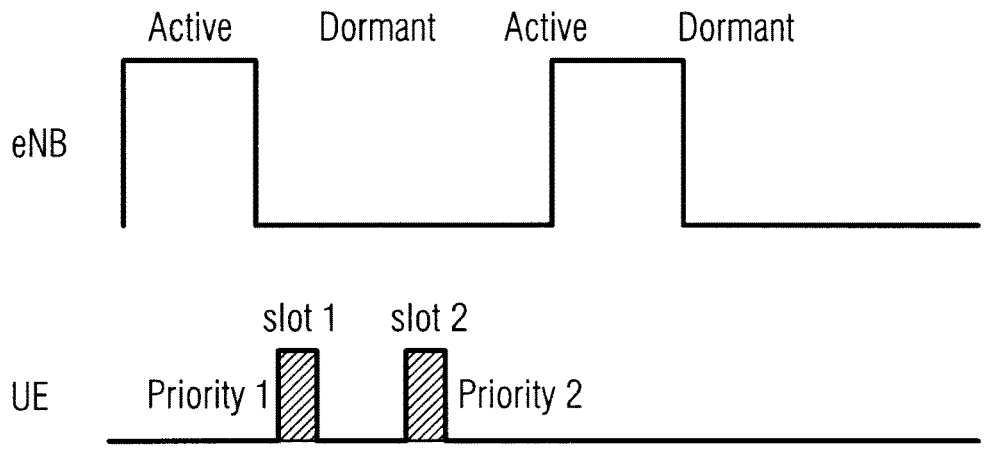
FIG. 9 illustrates one example of using different transmission time slots to indicate priority level according to an embodiment of the present invention.

Alternatively, the priority level may be indicated by the choice of transmission time slot for the trigger signal. For the example of two transmission time slots being available for trigger signal transmissions during a planned dormancy period of the serving eNB 2b, the earlier of the two time slots could be used to indicate a relatively high priority level, and the later of the two time slots could be used to indicate a relatively low priority level. This example is illustrated in FIG. 9.

Figure 10:
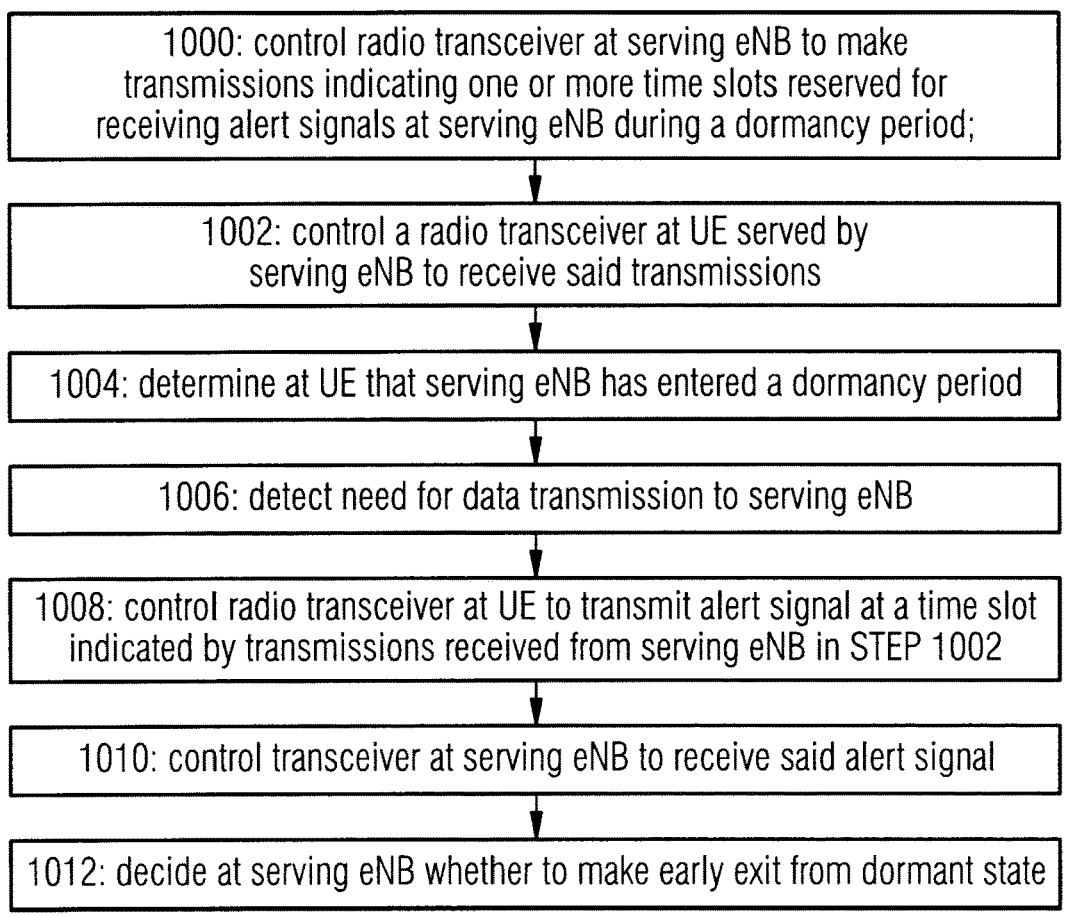
FIG. 10 illustrates an example of operations at UE and an access node in accordance with another embodiment of the present invention.

According to another embodiment, the small eNB is itself open to receiving alert signals at a limited number of predefined time slots during the dormancy period in which small eNB is not open to receiving other kinds of transmissions that it is open to receiving outside of the dormancy period. In advance of entering the dormancy period, the baseband processor 306 of the small eNB 2b controls the transceiver of eNB to broadcast information about when small eNB is open to receiving alert signals during the dormancy period (STEP 1000 of FIG. 10. The baseband processors 203 at the UEs served by the small eNB 2b control their transceivers to receive these transmissions by the small eNB 2b (STEP 1002 of FIG. 10), and control the storage of this received information at memory 207. In the event that a UE 6 served by small eNB 2b happens to have an urgent data packet to transmit during the dormancy period of the small eNB 2b (STEPS 1004 and 1006 of FIG. 10), the baseband processor 203 of the UE 6 controls the transceiver 203 of the UE 6 to transmit (STEP 1008 of FIG. 10) at one of said predefined time slots an alert signal that is recognizable to small eNB as a request for small eNB to exit said dormant state and switch to an active state in which it is more open to receiving radio transmissions. The baseband processor 306 of small eNB 2b controls the transceiver 303 of small eNB to receive transmissions in said predefined time slots (STEP 1010), and in response to detecting such an alert signal from UE 6, the baseband processor 306 of the small eNB 2b decides (STEP 1012 of FIG. 10) whether to make an early exit from the dormancy state based on rules stored at memory 307. As in the other embodiments described above, the small eNB may also make some limited transmissions during the dormancy period such as the transmission of reference/discovery signals. The predefined slots reserved for receiving alert signal transmissions by one or more UEs served by small eNB could be grouped together with the time slots for the limited transmissions by small eNB during the dormancy period.

The program code mentioned above may include software routines, applets and macros. Program code may, for example, be copied into the one or more memories 203, 307 from any apparatus-readable non-transitory data storage medium. Computer program codes may be coded by a programming language, which may be a high-level programming language, such as objective-C, C, C++, C#, Java, etc., or a low-level programming language, such as a machine language, or an assembler.

Alternatively, some of the above-described functions or other functions performed at the UEs or eNBs may be implemented by application specific integrated circuits (ASICs).

The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

What is claimed is:

1. A method, comprising:
receiving by a communication device, from a first access node serving the communication device in advance of the first access node entering a dormant first state in which said first access node is not receiving radio transmissions from the communication device, information about one or more features of radio signals, wherein the one or more features comprise a selected subset of predefined preamble sequences reserved as a trigger signal by said communication device and a priority level of the selected subset of predefined preamble sequences to trigger at least one second access node to cause said first access node to switch to a second state in which said first access node receives radio transmissions;
determining, by the communication device, that the first access node serving the communication device is currently in the dormant first state; and
transmitting, by the communication device, a radio signal that uses at least the selected subset of the one or more features and the priority level of the selected subset as the trigger signal to trigger the at least one second access node to cause said first access node to switch from said dormant first state to a second state in which said first access node receives radio transmissions from the communication device.

2. The method according to claim 1, wherein said radio signal is transmitted via a random access channel.

3. The method according to claim 1, wherein the transmitted radio signal is using root sequence indexes to map the selected subset.

4. The method according to claim 1, wherein the priority level is based on a class of the predefined preamble sequences, wherein the class of the predefined preamble sequences identifies any one of a high priority level; a medium priority level; and a low priority level of the predefined preamble sequences.

5. The method according to claim 1, wherein the transmitting comprises an indication of the priority level by a choice of a transmission time slot for the trigger signal.

6. A method comprising:
controlling, by a second access node, a radio receiver or radio transceiver at said second access node to monitor one or more communication devices served by a first access node comprising:
receiving from the first access node, by the second access node, information about one or more features of radio signals, wherein the one or more features comprise a selected subset of predefined preamble sequences reserved as a trigger signal and a priority level of the selected subset to trigger said second access node to cause said first access node to switch from a dormant state in which said first access node is not receiving radio transmissions to a second state in which said first access node receives radio transmissions;
receiving from a communication device of the one or more communication devices a radio signal using at least the selected subset of the one or more features as the trigger signal; and
based on the received radio signal using at least the selected subset of the one or more features and the priority level of the selected subset as the trigger signal, causing said first access node to switch from said dormant state to the second state in which said first access node receives radio transmissions from one or more of the one or more communication devices.

7. The method according to claim 6, wherein said radio resources are radio resources allocated to a random access channel for the first access node.

8. The method according to claim 6, further comprising receiving from said first access node information about when said first access node is in said dormant first state.

9. A method comprising:
controlling a first access node to enter a dormant first state in which said first access node does not receive radio transmissions from one or more communication devices served by said first access node;
in advance of said first access node entering said dormant first state, controlling a radio transmitter or radio transceiver to transmit to one or more communication devices served by said first access node information about features of radio signals, wherein the features comprise a selected subset of predefined preamble sequences reserved as a trigger signal and a priority level of the selected subset to at least be used in a request by said one or more communication devices to trigger at least one second access node to cause said first access node to switch to a second state in which said first access node receives radio transmissions from one or more of the one or more communication devices served by said first access node.

10. The method according to claim 9, further comprising: providing information to said at least one second access node about one or more characterising features of radio signals to be used by said one or more communication devices to alert said at least one second access node of the request to cause said first access node to switch to said second state.

11. The method according to claim 9, further comprising providing to said at least one second access node information about when said first access node is in said dormant first state.

12. An apparatus comprising:
a processor and memory including computer program code, wherein the memory and computer program code are configured to, with the processor, cause the apparatus to:
receive, by a communication device, from a first access node serving the communication device in advance of the first access node entering a dormant first state in which said first access node is not receiving radio transmissions from the communication device, information about one or more features of radio signals, wherein the one or more features comprise a selected one of a subset of predefined preamble sequences reserved as a trigger signal by said communication device and a priority level of the selected subset to trigger at least one second access node to cause said first access node to switch to a second state in which said first access node receives radio transmissions;
determine that the first access node serving the communication device is currently in a dormant first state in which said first access node is not receiving radio transmissions from the communication device; and
control a radio transmitter or radio transceiver at said communication device to transmit a radio signal using at least the selected subset of the one or more features as the trigger signal and the priority level of the selected subset to trigger the at least one second access node to cause said first access node to switch from said first dormant state to the second state in which said first access node receives radio transmissions from the communication device.

13. The apparatus according to claim 12, wherein said radio signal is transmitted via a random access channel, and said one or more features of said radio signal comprise a selected one of a subset of predefined preamble sequences.

14. An apparatus comprising:
a processor and memory including computer program code, wherein the memory and computer program code are configured to, with the processor, cause the apparatus to:
control a radio receiver or radio transceiver at a second access node to monitor one or more communication devices served by a first access node comprising:
receiving by the second access node, from a communication device, information about one or more features of radio signals, wherein the one or more features comprise a selected subset of predefined preamble sequences reserved as a trigger signal and a priority level of the selected subset to trigger said second access node to cause said first access node to switch from a dormant state in which said first access node is not receiving radio transmissions to a second state in which said first access node receives radio transmissions; and
based on the receiving, transmitting one or more radio signals that uses at the selected subset of the one or more features and the priority level of the selected subset as the trigger signal to cause said first access node to switch from said dormant state to the second state in which said first access node receives radio transmissions from one or more of the one or more communication devices.

15. The apparatus according to claim 14, wherein said radio resources are radio resources allocated to a random access channel for the first access node.

16. The apparatus according to claim 14, wherein said controlling is based on information received from said first access node about one or more characterising features of radio signals used by communication devices served by said first access node to indicate a request for said first access node to exit said dormant state.

17. The apparatus according to claim 14, wherein the memory and computer program code are further configured to, with the processor, cause the apparatus to: receive from said first access node information about when said first access node is in said dormant first state.

18. An apparatus comprising:
a processor and memory including computer program code, wherein the memory and computer program code are configured to, with the processor, cause the apparatus to:
control a first access node to enter a dormant first state in which said first access node does not receive radio transmissions from one or more communication devices served by said first access node; and
in advance of said first access node entering said first state, control a radio transmitter or radio transceiver to transmit to one or more communication devices served by said first access node information about features of radio signals, wherein the features comprise a selected subset of predefined preamble sequences and a priority level of the selected subset of predefined preamble sequences of predefined preamble sequences that is reserved as a trigger signal to at least be used in a request by said one or more communication devices to trigger at least one second access node to cause said first access node to switch to a second state in which said first access node receives radio transmissions from one or more of the one or more communication devices served by said first access node.

19. The apparatus according to claim 18, wherein the memory and computer program code are further configured to, with the processor, cause the apparatus to: provide information to said at least one second access node about one or more characterising features of radio signals to be used by said one or more communication devices to alert said at least one second access node of the request to cause said first access node to switch to said second state.

20. The apparatus according to claim 18, wherein the memory and computer program code are further configured to, with the processor, cause the apparatus to provide to said at least one second access node information about when said first access node is in said dormant first state.

* * * * *